Figure 1:
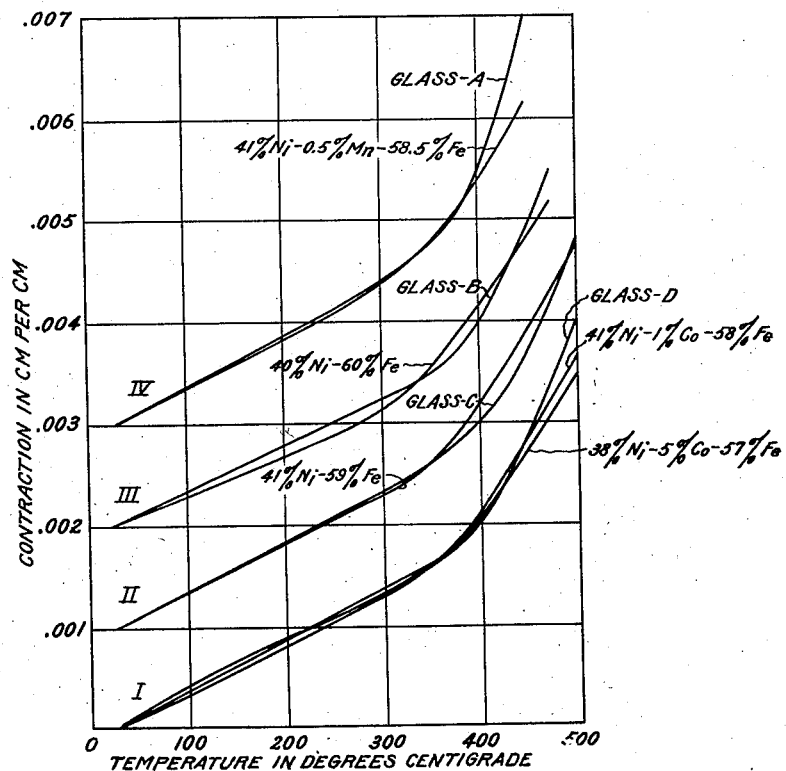

July 25, 1939.  A. W. HULL ET AL  2,167,482

GLASS-TO-METAL SEAL

Original Filed May 15, 1936

Inventors:
Albert W Hull,
Emmett E. Burger, by Harry E. Dunham
Their Attorney.

Patented July 25, 1939

2,167,482

UNITED STATES PATENT OFFICE 2,167,482

GLASS-TO-METAL SEAL

Albert W. Hull and Emmett E. Burger, Schenectady, N. Y., assignors to General Electric Company, a corporation of New York Application May 15, 1936, Serial No. 79,956
Renewed April 15, 1939

5 Claims. (Cl. 49—81)

The present invention relates to improved strain-free glass-to-metal seals and to combinations of materials suitable for producing the same.

It has previously been known that in order to form a satisfactory seal between glass and metal the stresses resulting from thermal expansion and contraction during the sealing period must not exceed the tensile strength of the glass. Until quite recently it had been assumed that this condition would be sufficiently fulfilled if substantial equality existed between the average coefficient of expansion of the metal and that of the glass as measured by observing the expansion of the latter at a temperature below the annealing point.

It is pointed out in an article by Dr. A. W. Hull and Mr. E. E. Burger appearing in vol. 5 No. 12, of Physics for December, 1934, that the thermal expansion characteristics of the various glasses are not linear for all temperatures but, on the contrary, possess a transformation zone of rapidly changing expansibility, this zone covering a range of temperatures appreciably below the annealing point. The authors further show that glass-to-metal seals will be strain-free at all temperatures if, and only if, the coefficient of expansion of the metal varies from room temperature to approximately the softening temperature of the glass to which it is to be sealed along a thermal characteristic curve which essentially matches that of the glass at all points both above and below the transformation zone of the latter. The maximum divergence which can be tolerated at any point between the thermal characteristics of the glass and metal is determined by the condition that strains set up during cooling must be less than the strength of the glass.

As an example of a material which adequately fulfills the requirements for production of a strain-free seal the authors describe an alloy of iron, nickel and cobalt (54% Fe, 28% Ni and 18% Co) which has a thermal expansion curve very similar to that of a standard hard glass (Corning G-71). While seals comprising these materials have proven to be mechanically very satisfactory, they possess certain disadvantages from a commercial point of view in that the cobalt alloy required is expensive and that the glass used is workable only at relatively high temperatures.

It is an object of the present invention to produce a new glass-to-metal seal in which the glass and metal have thermal characteristics which substantially correspond in value and slope at temperatures both above and below the transformation zone of the glass and which utilizes a class of relatively inexpensive nickel-iron alloys.

It is a further object of the invention to produce such a seal employing a glass whose softening point is low enough to permit the utilization of cheap fuels such as ordinary city gas and air in working the glass, and which at the same time suffers no chemical reduction when it is heated in hydrogen at 500° C.

It is a further object of the invention to utilize in an improved seal a glass having the above properties which meets the additional requirements of flowing readily when molten, of wetting the metal to which it must be bonded, and of having a relatively high electrical resistivity.

These objects are attained in accordance with the present invention by using a nickel-iron alloy comprising from about 39 to about 44 per cent nickel in combination with a boro-silicate glass of a class more fully specified hereinafter having an alkali content of from about 2 to 7 per cent.

Figure 2:
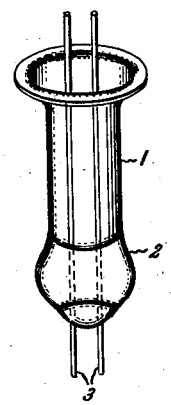
Figure 3:
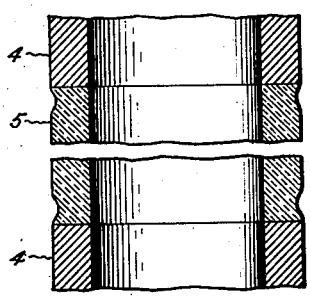

The novel features which we believe to be characteristic of our invention are set forth with particularity in the appended claims. Our invention itself, together with further objects and advantages thereof, will best be understood by reference to the following specification taken in connection with the accompanying drawing in which Fig. 1 comprises a series of curves illustrating the thermal characteristics of the components of our improved seal, and Figs. 2 and 3 illustrate the application of the invention to particular structures. In order to prevent a confusing overlap of the various curves of Fig. 1, each curve group with the exception of group I has been vertically displaced from its normal position. For this reason the following precautions must be observed in reading contraction values on the vertical axis: For curve group II subtract $$.001 \frac{cm}{cm}$$

from the apparently indicated value; for group III subtract $$.002 \frac{cm}{cm}$$

and for group IV subtract $$.003 \frac{cm}{cm}$$

The thermal characteristics of nickel-iron alloys containing from 25 per cent to 60 per cent nickel differ strikingly from those of most other metals in exhibiting distinct transformation zones in which the coefficient of expansion (or contraction) abruptly changes with increase in temperatures. In particular, nickel-iron alloys having a nickel content in the range from about 39 to 43 per cent, which range we consider to be comprised within the scope of our invention, have transformation zones below about 425 degrees C. and ranging from that value down to about 325° C.

While the transformation zones mentioned in the foregoing are of similar nature to those which characterize most glasses, it has heretofore been considered impractical to produce a satisfactory seal between these alloys and the glasses previously known due to the fact that the transformation zones of the latter in most cases occur considerably above 400° C. In other cases the average coefficients of expansion of the glasses differ so widely from those of the alloys that a sealing match is entirely out of the question.

In accordance with our present invention we have found that very satisfactory strain-free seals may be made by combining nickel-iron alloys containing from 61 to 57 per cent iron and a complementary proportion of pure nickel or nickel modified by slight percentages of cobalt with a boro-silicate glass of the type described and claimed in a co-pending application, Serial No. 79,877, Louis Navias, filed May 15, 1936. We have further found that by properly adjusting the compositions of the metal and glass a large number of combinations can be determined within the specified range such that the thermal characteristics of the two materials correspond to the extent necessary to produce substantially strain-free seals.

Certain glasses which have been found to be suitable for the purposes of the invention fall within the following range of compositions:

Table A

| | Per cent |
|---|---|
| $SiO_2$ | 52 to 64 |
| $B_2O_3$ | 29 to 40 |
| $Na_2O$ | 2 to 7 |
| $Al_2O_3$ | 0 to 5 |

For convenience in applying the invention the oxide compositions of the above tabulation correspond to those employed in the batch mixtures from which the various glasses are produced. It should be pointed out, however, that analysis of the completed glass might indicate a slightly different composition due to the reactions which necessarily occur during fusion. In general, this variation will consist in a slight decrease in the amount of $B_2O_3$ and $Na_2O$ as a result of evaporation.

A distinctive aspect of the glasses which are suitable for the practice of our invention consists in the fact that they comprise a boro-silicate composition containing a percentage of alkali material (such as sodium or potassium oxide) in a range of from about 2 to about 7 per cent. Due to their low softening points, which are uniformly less than about 675° C. they are able to be worked very readily in a flame using an inexpensive fuel such as a mixture of ordinary city fuel gas and air. Furthermore, they are uniformly distinguished by thermal expansion characteristics which have transformation zones occurring below about 425° C. and in most cases below 400° C.

Referring now to Fig. 1 of the drawing we have shown the thermal contraction characteristics of typical glasses and alloys coming within the specified range and combined in accordance with the principles of our invention. By the term "contraction characteristic", we intend to designate a curve showing the decrease in length at various temperatures of a unit length of material for one degree drop in temperature. Such a curve normally follows very closely the "expansion characteristic" which measured the specific increase in length for a one degree rise in temperature. It is, however, regarded as a somewhat more reliable index of the properties of the glass in being entirely independent of the previous thermal history of the specimen of glass selected for testing.

In considering Fig. 1, it will be noted that the contraction curve (characteristic) of each glass corresponds substantially to that of its associated metal, and that the transformation zone of each material occurs at about the same temperature range. In view of the resulting absence of any considerable divergence between the contraction coefficients of the selected pairs of materials, any seal in which they are combined will be essentially strain-free not only at the annealing temperature but also at all other temperatures below that value.

It should be noted that if the characteristic curves of the glass and metal are of generally similar slope at temperatures above and below the transformation zone, a slight divergence between them will not result in serious strain accumulations, even where the mass of the metal is large in comparison with that of the glass.

The composition of the particular alloy associated with each of the curves of Fig. 1 is indicated by the legend attached thereto while the composition of the corresponding glass may be obtained from the following table in which the index letters correspond to those of the drawing. As explained in the aforementioned Navias application, Serial No. 79,877, the sodium oxide components may be replaced by equivalent proportions of other alkaline oxides such as potassium or lithium, taking into consideration the known differences in these materials.

Table B

| | A | B | C | D |
|---|---|---|---|---|
| $SiO_2$ | 54 | 64 | 60 | 58 |
| $B_2O_3$ | 40 | 30 | 31 | 33 |
| $Na_2O$ | 3 | 3 | 6 | 6 |
| $Al_2O_3$ | 3 | 3 | 3 | 3 |

Among the various examples given in the drawing we consider combination II, employing a 41 per cent nickel-iron alloy and the glass designated as "Glass C", to be a preferred embodiment of our invention. The glass of this combination we have found to possess somewhat greater stability than those of lower alkali content and, at the same time, to possess a transformation zone sufficiently low to enable it to be matched by an alloy whose low nickel content considerably decreases its cost.

It should be pointed out that the glass materials which employ an amount of boron oxide ($B_2O_3$) in excess of about 35 per cent tend to suffer some deterioration when exposed to moisture under adverse circumstances. For this reason we consider it desirable in the use of seals embodying such glasses to provide the same with a coating of a material capable of excluding moisture such for example as a baking enamel of the alkyd resin type.

The glass alloy combinations labeled on the drawing as II and III respectively are illustrative of the metal combinations consisting of iron and commercially pure nickel. It is recognized, however, that cobalt is a common impurity in most available supplies of nickel, and we have found that its presence as a modifying element may prove useful rather than otherwise in helping to control the transformation zone of the alloy. Thus, by the addition of small percentages of cobalt up to about 5 or 6 per cent the transformation zone of a particular alloy may be raised to correspond more closely with that of a particular glass in the specified group. We therefore consider as included within the scope of our invention seals embodying alloys of iron with a nickel-cobalt combination in the sum of from 39 to 44 per cent and in which the cobalt measures from zero to about 5 or 6 per cent.

The group of curves designated by the numeral I show the contraction characteristics of a preferred glass and of a pair of closely matched iron alloys containing nickel and cobalt. It will be noted that the one glass (Glass D) provides an extremely perfect match for two entirely distinct metal combinations containing 41 per cent nickel and 1.0 per cent cobalt in the one case and 38 per cent nickel with 5 per cent cobalt in the other. It should be unnecessary to point out that slight variations in the glass composition can be compensated for by corresponding changes in the alloy percentages without departing from the scope of our invention.

In addition to cobalt very small quantities of manganese and silicon may be considered desirable constituents of the alloy from the point of view of improving its workability. However, beyond about 0.5 per cent either of these ingredients may be sufficient to change the expansion characteristic of the alloy to an extent which interferes with good sealing. An alloy composition which approaches this last-named limit and a glass which affords a fairly good match therewith is shown in curve combination IV.

Various applications of the invention are illustrated in Figs. 2 and 3 of the drawing. In Fig. 2, for example, we have shown a flared stem I adapted to be sealed into the base of a glass envelope. The stem terminates at one end in a press 2 into which is fused a pair of lead-in conductors 3. These conductors may consist of any of the alloys described in the foregoing, while the stem, or at least the pressed portion thereof, should consist of a glass of the class specified having thermal characteristics matched with those of the lead-in conductors.

In constructing a glass-to-metal seal of this type the glass is first heated sufficiently to enable it to wet a metal surface. For the particular glasses described this will occur at a temperature which is unusually low in comparison with other known glasses of the low expansion class. Thereafter the conductors 4 may be inserted and the glass pressed down and cooled at a uniform rate to room temperature. Due to the similarity of the contraction characteristic of the glass and metal up to the softening temperature of the former, a strain-free seal may be obtained without the necessity of holding the combination for a relatively long time at the so-called annealing temperature (defined as the temperatures at which 90 per cent of the strains in the glass will be eliminated in a period of about 15 minutes). The only limitation as to the rate of cooling that need be observed is that which will avoid internal strains in the portion of the glass remote from the seal due to unequal cooling.

In Fig. 3 we have shown an alternative application of the invention in connection with a so-called "butt-seal". In this embodiment a pair of metal cylinders 4 of a nickel-iron alloy falling within the scope of our invention are joined by direct fusion to an intermediate cylinder 5 of a glass of the type specified herein having matching characteristics. Due to the fact that the combinations which we have described are essentially strain-free at all temperatures within the range covered during the sealing operation, limitations of seal size are practically non-existent insofar as these depend on differences in thermal characteristics. Thus, seals of the form illustrated may be made utilizing cylinders as large as six inches or more in diameter and of any desired wall thickness. Even this size is not limiting provided due precautions are observed with respect to obtaining equal rates of heating and cooling for the various metal and glass parts.

What we claim as new and desire to secure by Letters Patent of the United States is:

1. A glass-to-metal seal comprising a glass which contains from about 50 to 64 per cent $SiO_2$, from about 29 to 40 per cent $B_2O_3$, and from about 2 to 7 per cent of an alkali material in combination with an alloy consisting essentially of from about 39 to 43 per cent nickel with a complementary proportion of iron, said glass and said alloy having thermal contraction characteristics which substantially correspond at temperatures both above and below the transformation zone.

2. A strain-free glass-to-metal seal comprising a glass which contains about 60 per cent $SiO_2$, about 31 per cent $B_2O_3$, about 6 per cent $Na_2O$, and a complementary proportion of $Al_2O_3$ in combination with an alloy consisting essentially of about 41 per cent nickel and 59 per cent iron.

3. A glass-to-metal seal comprising a glass which contains about 58 per cent $SiO_2$; about 33 per cent $B_2O_3$; about 6 per cent $Na_2O$; about 3 per cent $Al_2O_3$ in combination with an alloy consisting essentially of iron combined with nickel and cobalt in a sum of about 39 to 44 per cent and in which the cobalt comprises from 0 to about 6 per cent, said glass and said alloy having thermal characteristics which substantially correspond at temperatures both above and below the transformation zone.

4. A glass-to-metal seal comprising a glass the oxide composition of which contains about 58 per cent $SiO_2$, about 33 per cent $B_2O_3$, about 6 per cent $Na_2O$, and about 3 per cent $Al_2O_3$ in combination with an alloy consisting essentially of iron combined with nickel and cobalt in a sum of about 42 to 43 per cent, and in which the cobalt comprises from 1 to 5 per cent, said glass and said alloy having thermal characteristics which substantially correspond at temperatures at, above and below the transformation zone of the glass.

5. A glass-to-metal seal comprising a glass which contains from about 50 to 64 per cent $SiO_2$, from about 29 to 40 per cent $B_2O_3$, and from about 2 to 7 per cent of an alkali material in combination with an alloy consisting essentially of iron combined with nickel and cobalt in a sum of from about 39 to 44 per cent and in which the cobalt comprises from 0 to 5 per cent, said glass and said alloy having thermal contraction characteristics which substantially correspond at temperatures both above and below the transformation zone.

ALBERT W. HULL.
EMMETT E. BURGER.